Figure 1:
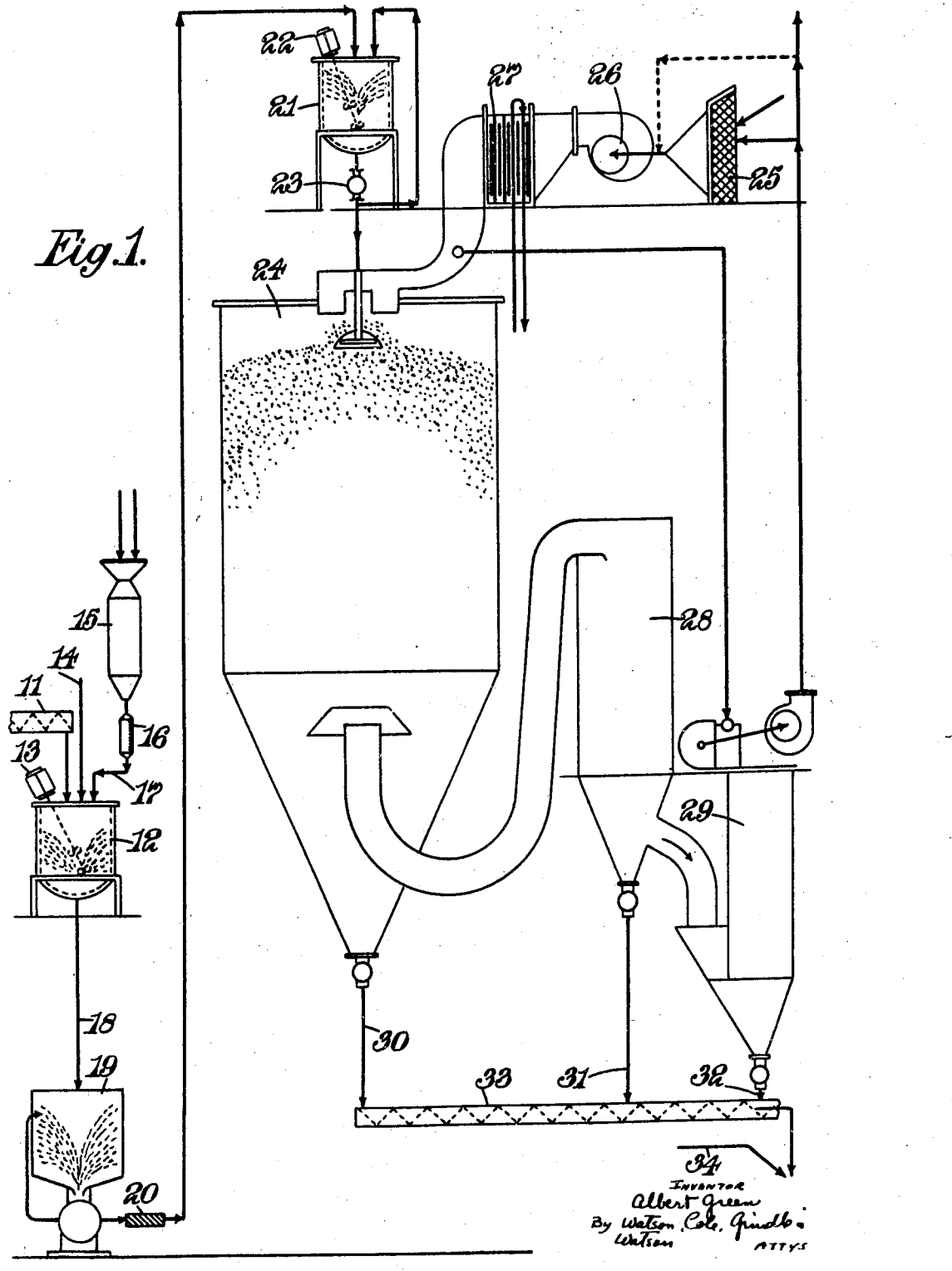

May 11, 1948.  A. GREEN  2,441,409
SPECIAL FLOUR AND MANUFACTURE THEREOF
Filed March 1, 1943  2 Sheets-Sheet 1

Inventor
Albert Green
By Watson, Cole, Grindle & Watson
Attys

Patented May 11, 1948

UNITED STATES PATENT OFFICE 2,441,409

SPECIAL FLOUR AND MANUFACTURE THEREOF

Albert Green, Chislehurst, England

Application March 1, 1943, Serial No. 477,628
In Great Britain November 8, 1938

9 Claims. (Cl. 99—11)

This application is a continuation in part of my application Serial No. 304,432, filed November 14, 1939, for improvements in methods and apparatus for the manufacture of special bakers' flours.

The invention relates to an improved product, namely, flour having uniformly distributed therethrough particles of flour or other edible farinaceous or cereal product containing one or more adjuvants or accessory food factors, particularly a soluble salt or salts of aneurin; it also relates to an improved product comprising granular particles of flour or other edible farinaceous or cereal product, containing one or more of the said adjuvants, particularly the soluble aneurin salt or salts, such particles being well adapted for being mixed with and uniformly distributed through baker's flour. Preferably, the granular particles referred to comprise what may be termed a solid solution of the aneurin salt or other adjuvant in the edible product. The invention also relates to improved methods by which the said products may be manufactured.

The invention also particularly relates to products similar to those above-mentioned in which the contained adjuvant is a water-soluble iron compound or a compound of a trace metal such as copper or cobalt, and to improved methods (similar to the methods employed when the contained substance is an aneurin salt), by which such products may be manufactured.

The objects of the invention comprise the provision of methods, whereby flour, otherwise deemed deficient in one or more of the said adjuvants (hereinafter more particularly defined) and particularly the antineuritic vitamin $B_1$ and/or a soluble iron compound, may have the same added thereto and uniformly distributed therethrough, effectively, to produce a flour of good quality from various standpoints, containing dietetically-correct proportions of the said substance or substances in a form which is readily assimilable by the human system when bread or other products of the flour are eaten, and the provision of products as above referred to, which may be produced by practising such methods.

Official approval has been given in the United States to the term "enriched flour" as connoting flour containing added thiamin (aneurin, vitamin $B_1$), nicotinic acid (niacin, P—P factor) or its amide, an iron compound, and riboflavin (lactoflavin, vitamin $B_2$) in approved amounts (the omission of the riboflavin being, however, permitted until a greater quantity of this substance becomes available). These substances are referred to herein as adjuvants and all of them (and also other substances such as soluble compounds of copper or cobalt, which may be deemed desirable, from the standpoint of nutritional value, as additions, in small quantities, to the flour), may be added to the flour by the process presently to be described, with the reservation that only the salts or compounds of iron or other metals which are readily water-soluble may effectively be thus added. All of the adjuvants mentioned above, except iron, or other metal and their salts or other compounds belong to the group of water-soluble B vitamins. The following specification will particularly describe the process of adding an aneurin salt, and the resulting products, it being understood that other adjuvants may also be added, as will later be described.

As is well known, bakers' flours, more particularly white flour, have the bran and germ removed therefrom in the course of manufacture, those substances containing anti-neuritic vitamin $B_1$. Various proposals have been made for the restoration to the flour of proper proportions of this vitamin or for the manufacture of white bread containing proper proportions of the same, by the reintroduction therein of germ or bran or other natural vitamin B-containing product. With such methods it is, however, in my opinion, difficult to prevent deleterious effects to the colour and to the baking quality of the bread. Further, germ and bran have an aneurin content which varies over a considerable range, so that with the introduction of these materials it is extremely difficult, to say the least, to control or measure the proportion of the vitamin added.

I have determined that these difficulties may be overcome and, that flour may be made by the process hereinafter described, containing dietetically-correct proportions of a soluble salt of aneurin such as aneurin hydrochloride (also known as aneurin chloride hydrochloride, or thiamin hydrochloride), unaccompanied by other chemical compounds which are present in bran and germ, with excellent results, aneurin being defined as the free base to which has been ascribed the formula $C_{12}H_{16}N_4OS$. Among these it may be mentioned that when loaves were baked from white flour prepared as herein described, including the soluble aneurin salt, and, under identical conditions, from the same white flour without the addition of the aneurin salt, the two products were indistinguishable in crumb colour, texture, bloom, brightness, loaf volume, and other desirable characteristics. It was also determined that the aneurin was contained in the flour, and in the bread, in desired predetermined proportions and was uniformly distributed therethrough, and that it could be quantitatively extracted from the flour at room temperature, by water, in substantially the amounts introduced therein and from the loaves baked therefrom with only the comparatively small loss from the crust or outer layer that is normal in baking operations which is the case with both the natural and added vitamin aneurin. It was further determined experimentally, that the greater part of 100 grams of bread, baked from flour which included the aneurin salt in accordance with this invention, went into solution in human gastric juice, after being thoroughly mixed therewith and incubated at 37° C. for four hours, the vitamin $B_1$ content of the bread being thereafter found to be contained in the solution. It was further concluded by feeding tests that bread baked from flour which included the aneurin salt, in accordance with the invention, had no intestinal irritant effect, such as has been found to occur when bread containing bran was eaten.

Considerable difficulties were, however, encountered when it was attempted to introduce the aneurin salt into and distribute it evenly throughout the flour, it being understood that the quantity of aneurin salt to be introduced is extremely minute in proportion to the bulk of the flour. With various methods attempted, both with the aneurin salt in the dry state and dissolved in solvents, results were unsatisfactory because of lack of uniformity of adsorption and local concentrations of the aneurin salt, and in some cases involving solvents, harmful effects of the latter upon the flour particles. With dry mixtures, local concentrations are due at least in part to the different densities of the particles of the aneurin salt and of the flour particles. Also, it is found that the aneurin salt cannot be fed evenly into a stream of flour in the mill, even when there has been a preliminary mixture of the aneurin salt in a small batch of flour or other edible product. This is particularly the case when the aneurin salt, such as aneurin hydrochloride, is crystalline, the jagged structure of the crystals tending to prevent an easy even flow of the same.

I overcome these difficulties by making a granular powder of flour or other edible farinaceous or cereal product within the granules of which the aneurin salt is contained, in suitable small proportions, this powder being of such a character that it will flow easily and uniformly when it is fed in to the flour stream. This is preferably accomplished by dissolving a measured quantity of the aneurin salt in water, and intimately mixing this solution with a suspension of a measured quantity of flour or other edible farinaceous or cereal product in water, to form a pasty mass of flour (or other suitable edible product) suspended in water, with the aneurin salt dissolved therein. This material is then spray-dried, i. e., it is passed through a spray nozzle in a spray drying chamber where it meets a current of hot air of low humidity. This treatment produced round granules of material which may be regarded as a solid solution of the aneurin salt in the edible farinaceous product, the aneurin salt and farinaceous product forming a homogeneous mixture with the aneurin salt enclosed and tenaciously bound within the much greater mass of said product. This material has, because of the drying, a moisture content not exceeding or not substantially exceeding 12%. The moisture content of the granules is preferably less than is above indicated, as for example from 4 to 6%.

This granular product is advantageous for a number of reasons. Because of the method of preparation each granule contains a predetermined, quite definite, proportion of the aneurin salt. These granules are similar in size to the particles of the flour with which they are to be mixed, and are found to possess the highly advantageous characteristic that they flow easily and smoothly. It is therefore possible to feed them at a uniform rate into a stream of flour, and the admixture of the same with the flour is preferably carried out by feeding this granular "concentrate" at a determined rate into the flour stream in the flour mill at a point where this stream is advancing towards the final steps of the flour milling process. By this means a predetermined quantity of the aneurin salt, in dietetically-correct proportion, is introduced into and uniformly distributed through the flour.

This granular concentrate has the further advantages that, being of low moisture content, and the aneurin salt therein being protected against oxidation and other harmful agencies, it will keep well in storage and can readily be transported, without deterioration or impairment of its properties. Likewise, it has been found to withstand passage through the rolls of the flour mill mixed with the flour, without deterioration due to the relatively high temperatures, large volumes of air, and high humidity, which are apt to be encountered there. Similarly, the flour which contains the granular concentrate distributed therethrough is not harmfully affected by the presence of the aneurin salt, but possesses all the excellent qualities of the unfortified flour, and, of course, additionally possesses the advantage that the presence of the correct amount of vitamin $B_1$, enhances carbohydrate metabolism and thus enables the digestive organs to assimilate the maximum amount of the carbohydrate constituents of the bread baked from the flour. The protection of the aneurin salt against harmful agencies, referred to above, is, of course, afforded by the fact that it is to a great degree enclosed in and surrounded by the flour or other edible product with which it is in solid solution, in the granules of the concentrate.

As an example of the manner in which the described method may be practised, attention is directed to the accompanying drawings, in which—

Figure 1 represents, diagrammatically, apparatus by which the process described above may be practised, and Figure 2 represents, diagrammatically, apparatus by which a further stage of the process may be practised, when additional protection against possible contact between the adjuvant contained in the concentrate is thought desirable.

Referring to Figure 1, the reference character 11 represents the end of a worm which feeds flour at a controlled rate to a mixing vessel 12 having a capacity of 120 gallons and provided with a motor-driven stirrer 13, the amount of flour being 280 lbs. per batch. 560 lbs. of water are introduced into the mixing vessel by way of the pipe 14 and measured amounts of aneurin hydrochloride solution from the storage vessel 15 via the measuring vessel 16 and the pipe 17. From the mixing vessel 12 the freely-flowing mixture of water, flour and aneurin salt in solution flows through the pipe 18 into the 110 gallon homogeniser 19 and thence via the strainer 20 to a second storage vessel 21 provided with a motor-driven stirrer 22. Liquid from the storage vessel 21 is forced by means of the pump 23 into the spray-drying chamber 24 of a Kestner spray-dryer which is supplied with hot air via a filter, fan and heater indicated respectively by 25, 26 and 27.

Part of the finely-divided dried solid falls to the bottom of the chamber 24 while the remainder is carried away in the air current to dust-catching chambers 28 and 29, a proportion of the air being re-circulated from chamber 29 to the dryer in the normal way.

The powdered solid leaves the drying chamber 24 and the dust-catching chambers 28 and 29 by the conduits 30, 31 and 32 respectively and enters the cooling worm 33. After leaving the worm 33 the flour containing the aneurin salt intimately associated therewith is mixed with a further bulk of flour so as to introduce the aneurin salt into the mixture in suitable dietetic proportion, this further step being indicated by the arrow, reference character 34.

If desired, a vacuum pan may be interposed between the homogeniser and the spray-drying chamber.

The following observations on the process as heretofore described should be noted. The aneurin salt used may be the well-known aneurin hydrochloride referred to above, or other available water-soluble salt, crystalline or amorphous, of which the activity of the vitamin $B_1$ in international units is known or may be ascertained readily. In the following notes aneurin hydrochloride will be specifically referred to. The amount introduced into the final flour may be in any proportion which is determined to be dietetically suitable, for example from 0.1 to 1 gram per 280 pounds of flour. The amount of the aneurin salt incorporated in a given quantity of the granular concentrate being known, it is only necessary to feed the concentrate into the flour stream at the mill at such a rate in pounds per hour, the rate of passage of the main flour stream in pounds per hour being known, as to result in the predetermined small percentage of the aneurin salt being introduced therein. For example, I have found it good practice to introduce one ounce of the granular concentrate containing about 0.2 gram of aneurin hydrochloride, in every 280 pounds of white flour.

The relative amounts of flour (or other edible product), water and aneurin salt mixed together prior to the spray drying will depend upon a number of considerations. The water must be sufficient in quantity to form a smooth cream with the flour or like product, this depending on the characteristics of the flour or other product used, as well as sufficient, of course, to dissolve the aneurin salt. The flour or like product must be present in many times the quantity of the aneurin salt, so that the latter will be well surrounded and protected against oxidation, etc. as explained above. Further, the viscosity and water content of the material when it is introduced through the atomizer nozzle into the spray dryer are factors of importance in the drying process, because if there is too much water there will be incomplete drying with consequent sticking of the product on the sides of the dryer. As an indication of proportions which have been found suitable, I have operated by adding to every 280 pounds of white flour, 864 grams of aneurin hydrochloride and 56 gallons of water, these proportions, however, being subject to variation in accordance with conditions, as above stated.

Further, the temperature of the air entering the dryer must not be too high or its humidity too low, as otherwise the product during drying and after drying may be overheated, with consequent loss in its vitamin content, it being noted that vitamin $B_1$ cannot withstand temperatures much in excess of 100° C., except momentarily, without deterioration. The spray drying of the concentrate therefore requires delicate adjustment of the relative amounts of flour, water and aneurin salt and the temperature and humidity conditions in the dryer. I have found that good results were obtained by maintaining the incoming drying air at a temperature of 140° C., low humidity, and atmospheric pressure, and the temperature of the air leaving the dryer at 80° C. The drying in this example was carried out rapidly, so that the temperature of the drying material did not at any time exceed 100° C., and the dried powder had a temperature of about 40° C. In this instance the powdered concentrate had a moisture content of from 4 to 6%, and it should in all cases have a moisture content not substantially exceeding 12%.

The material with which the aneurin salt in solution is mixed, before the spray drying operation, may be, as indicated above, flour or any edible farinaceous or cereal product which is found to form granular particles, when treated as described, which will flow readily into the flour stream. It may be noted that, with the precise temperature control during the drying process which is indicated above no chemical changes in the aneurin salt take place, and the aneurin salt when incorporated in the flour still possesses its full power of promoting carbohydrate metabolism, unaffected, so far as I can determine, while at the same time the loaf quality of the flour including volume and crumb texture are unaffected by the presence of the aneurin, as well as the taste or flavour, colour and odour of the bread, and fermentation has been affected in no way which would make handling of the dough difficult. The heat-treatment of the granular particles of the concentrate during the drying thereof seems to be a factor in giving the granules the property of flowing easily, as noted. It may also be remarked that the conditions on roller mills are conducive to oxidation. The flour stocks in contact with the rolls experience temperatures as high as 114° F., and at the same time are exposed to large volumes of air which continuously blow through the milling machines. There are also sometimes conditions of high humidity, encountered by the flour stream as it, together with the admixed granular concentrate passes through the mill, which on occasions leads to the condensation of water vapour to water. The aneurin salt within the granular particles withstands these conditions, as noted, this being due in part to the low moisture content of the granules which is maintained tenaciously and in part to the relatively hard and impervious nature of the granules. The protecting layers or mass of flour or other edible product in which the aneurin salt is encased serves, obviously, to protect it against oxidation. It also doubtlessly serves to protect it against microbial attack or similar danger.

For the reasons above set forth I consider that it is essential, in order to obtain the improved results described, that the aneurin salt be contained and enclosed wholly or largely, within granules or particles of flour or other suitable edible product, of such character as to flow easily and uniformly into a stream or mass of flour, and my improved process includes the use of the spray dryer or equivalent means for producing such particles.

As has been stated above, all of the adjuvants referred to, when used, are added in small quantities of roughly the same order as the quantities described above as suitable in the case of aneurin hydrochloride, it being noted that generally the quantities of nicotine acid or its amide and of iron salts will be somewhat greater than in the case of the other substances mentioned. All of them are water-soluble (if, in the case of iron, or other metal, only readily soluble compounds are referred to), and all of them can be added by the process described above, with similar advantage in respect to ease of flow of granular particles containing an adjuvant into the flour stream and uniform distribution therethrough, and also with similar advantage in respect to protection of the added substance against oxidation and other harmful factors and control of the quantity of the adjuvant added. With all of them, when ordinary dry mixing with flour is attempted, similar difficulties to those described above are encountered, with respect to local concentration of the adjuvant in the flour and difficulty of obtaining uniform distribution. The soluble adjuvants referred to are chiefly available in crystalline form, which tends to make even flow of the same into the flour stream, by a dry mixing process, particularly difficult, as was explained above in connection with aneurin.

When more than one adjuvant is to be added to the flour, such as one or more of the water-soluble B vitamins mentioned and/or a soluble iron salt, in addition to the aneurin salt, my preferred practice is to prepare granular particles each of which contains a small proportion of one only of the substances to be added. Thus, the granular particles containing the aneurin salt in solid solution in flour or other farinaceous or cereal product would be produced in the manner described in detail above and with each of the other added substances the same procedure would be followed, the added substance, such as nicotinic acid, being dissolved in water, mixed with a farinaceous or cereal product suspended in water, and the resultant pasty material spray-dried as described above to produce granular particles. These various concentrates, when used, will be fed into the main flour stream in the manner already described, all of them flowing easily and smoothly into the flour and being uniformly mixed therein and distributed therethrough. The advantage of this procedure, over the alternative method of dissolving the various adjuvants together and making one concentrate, by spray drying, containing all of the same, is that thereby contact and possible interaction between the various adjuvants is prevented. Such interaction may occur, for example, when two or more adjuvants are dissolved together, prior to the drying out of the granular particles. This is of especial importance in the case of compounds of iron or other metals which have the characteristic of acting as oxygen carriers, which may induce an adverse oxidising action on the various vitamin constituents if brought into contact with them prior to mixing into the bulk of the flour.

The described procedure has a particular advantage when iron in some form is to be added to the flour, either with or without the addition of an aneurin salt or other adjuvant, in that thereby a readily soluble iron compound may be incorporated, the easily soluble (e. g., ferrous) iron compounds being more easily assimilable in the human organism than the less soluble compounds. The readily soluble iron compounds, if mixed with flour by an ordinary dry mixing process, tend to promote relatively rapid rancidity in the flour. It is believed that this is because they act as catalysts or oxygen carriers and therefor cause oxidative rancidity to develop in the fats of the flour with which they are in contact. For this reason certain other iron compounds have been recommended for use, these being only sparingly soluble but having less tendency to promote rancidity. The use of these salts, however, has a nutritional disadvantage which tends to defeat the object for which they are added, that is, absorption into the human system.

This difficulty is overcome by the method herein described, since easily soluble and therefore easily assimilable iron compounds may be incorporated in the granules of edible material and prevented, by the enveloping material of these granules, from making intimate contact with the bulk of the flour to which the concentrate is added. When the flour is doughed up with water for breadmaking, contact between the iron addition and the bulk of the flour is of course established, but the period of time involved is much too short for any harmful action to occur. In this method it is advantageous to use a farinaceous or cereal substance such as a starch or cereal flour, characterized by a low oil or fat content, as the material in which the iron compound forms a solid solution in the form of the granular particles.

It will be noted that the addition of a rancidity-promoting iron compound to the flour presents the problem of protecting the flour against deleterious action of this adjuvant (as well as protecting the other adjuvants against harmful action by the iron compound), whereas in the case of an aneurin salt or other water-soluble B vitamin the corresponding problem is the protection of this adjuvant itself against oxidation or other harmful factor. It is nevertheless the fact that the same technique, as above set forth, may successfully be applied in all of these cases.

It is sometimes desired to add very small proportions of one or another of the so-called trace metals, such as copper or cobalt, to the flour, and water-soluble compounds of the same may be added by the same method, with similar advantages. Soluble copper compounds, for example, are known to be rancidity-promoters, when mixed with flour. With such substances, it is advantageous to use a farinaceous or cereal substance of low oil or fat content as the material in which the adjuvant forms a solid solution in the form of granular particles, as above explained in reference to iron compounds. Other reinforcements, such as calcium compounds, are also sometimes desired, and these, in water-soluble form, may also be incorporated by the described method, with various of the advantages above referred to.

With all of the suggested added materials the same method as has been particularly described above in the case of aneurin hydrochloride may be practised with only the variations of relative amounts of water, flour and added material, and temperature and humidity conditions in the drier, which are suggested by the properties of the particular adjuvant in question and are readily determined in practice. The amounts of the adjuvants to be added may be determined by the official requirements or recommendations above referred to, or, generally, by the proportions which are known to be nutritionally desirable.

In some cases, as with the iron compounds, it may be found desirable to provide additional protection for the adjuvant in the granular particles, or against possible contact between the adjuvant in the particles and the flour, and this may be accomplished by a further step in the process. This consists in providing the granular particles with an overcoating of purely farinaceous or cereal material, in which no iron or other adjuvant is carried. This may effectively be accomplished, for example, by causing the granular particles to descend as a "curtain" while a further spray of farinaceous emulsion is projected thereon.

Figure 2:
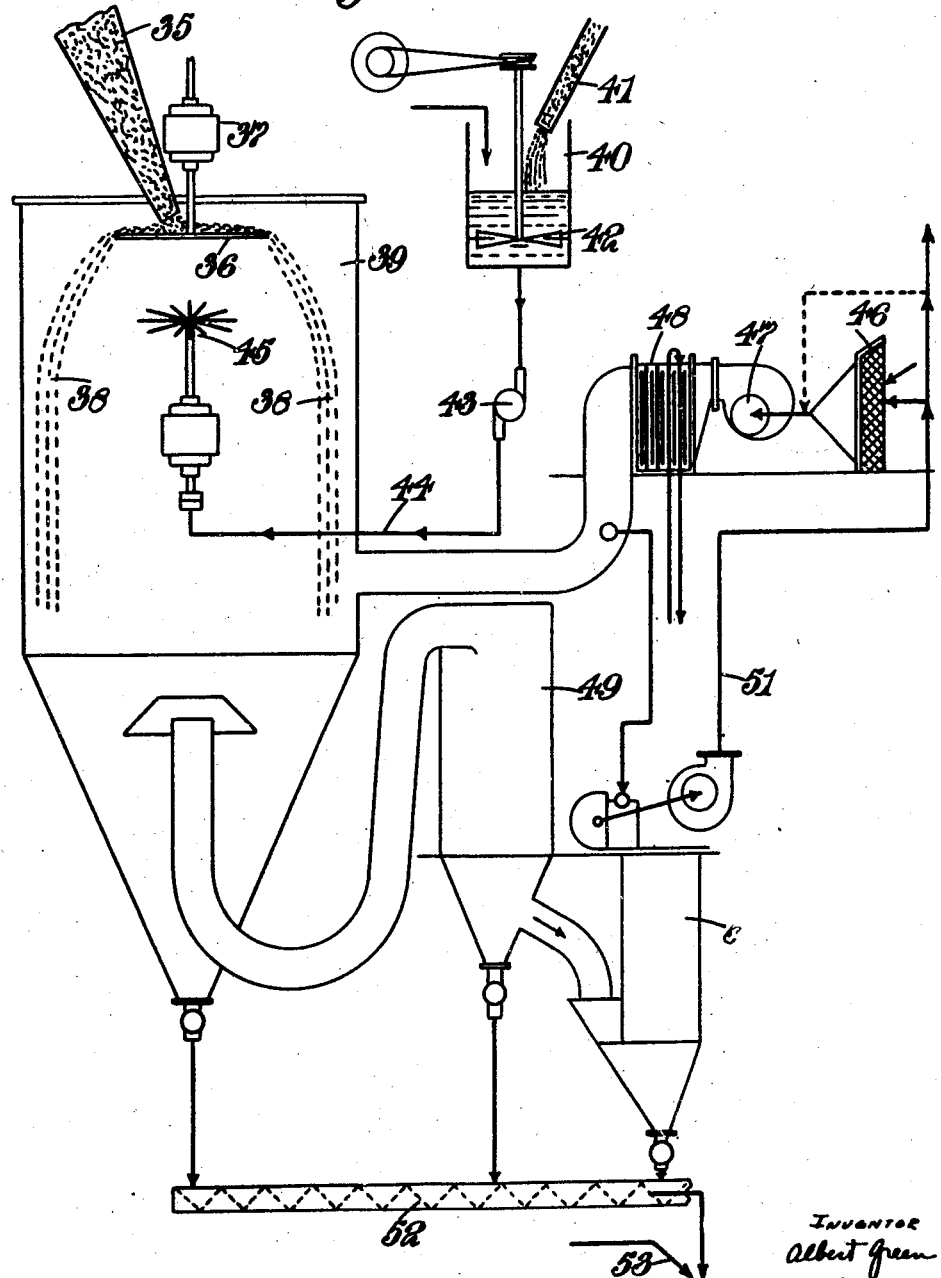

One manner of doing this is shown in Figure 2 of the drawings, in which the granular spray-dried concentrate is shown as being fed through chute 35 on to a disc 36, which is rotated at desired speed, as by a motor indicated at 37. The concentrate is thrown off the disc and descends in a "curtain" indicated at 38, this, together with the disc, being contained within a closed chamber 39. Flour or other farinaceous material enters mixing vessel 40, by chute 41 and is there mixed with water by stirrer 42 to form a dispersion of desired character. This is fed by the pump indicated at 43 and piping 44 to rotary spray nozzles 45 in the chamber 39 and within the descending curtain of concentrate. The descending granular particles in the curtain rotate as they fall, because of the motion imparted to them by the disc 36 and they are therefore thoroughly coated by the dispersion projected on them by the rotating nozzles 45. The coating may be made more or less fine as required, by adjustment of the various factors involved, the rates of feed of the concentrate and of the coating dispersion, and the speeds of rotation of the disc and the rotary nozzles 45.

Chamber 39 may be a drying chamber supplied with hot air by way of a filter 46, a fan 47 and a heater 48. Part of the dried and coated particles falls to the bottom of the chamber, while the remainder may, as shown, pass with the air current from the chamber to settling chambers 49 and 50, a proportion of the air being returned via connections 51 to the filter 46 and thence to the drying chamber 39. The final product, the coated granular particles, passes from chambers 39, 49 and 50 to a worm 52, from which it goes, as indicated at 53, for ultimate mixture with the main flour stream at the mill, as previously explained.

I claim:

1. The process of manufacturing flour, which comprises dissolving a water-soluble crystalline salt of the free aneurin base in water, mixing the same with an edible farinaceous product, in measured quantities, to produce a suspension of said product in water containing a small percentage of said salt in solution, atomizing and spray-drying the mass to produce a granular powder consisting of rounded particles, and thoroughly mixing the same with a much larger quantity of flour.

2. The process of manufacturing flour, which comprises dissolving in water a crystalline form of a substance which substance occurs naturally in wheat, the incorporation of small quantities of which in flour is deemed nutritionally desirable, mixing the same in measured quantities with an edible farinaceous product to produce a suspension of said product in water having a small percentage of said substance in solution, atomizing and spray-drying the mass to produce a granular powder consisting of rounded particles, and thoroughly mixing the same with a much larger quantity of flour.

3. In a process of manufacturing flour, the steps which comprise dissolving a water-soluble crystalline salt of the free aneurin base in water, mixing the same with an edible farinaceous product, in measured quantities, to produce a suspension of said product containing a small percentage of said salt in solution, and atomizing and spray-drying the mass to produce a granular powder consisting of rounded particles of a size similar to that of particles of flour.

4. In a process of manufacturing flour, the steps which comprise dissolving in water a crystalline form of a substance which substance occurs naturally in wheat and the incorporation of small quantities of which in flour is deemed nutritionally desirable, and which in its said crystalline form has an angular structure when broken, mixing the same in measured quantities with an edible farinaceous product to produce a suspension of said product in water having a small percentage of said substance in solution, and atomizing and spray-drying the mass to produce a granular powder consisting of rounded particles of a size similar to that of particles of flour.

5. An improved product comprising flour having uniformly distributed therethrough rounded granular particles of an edible farinaceous product having a small proportion of a crystalline form of a water soluble substance which substance occurs naturally in wheat and the incorporation of small quantities of which in flour is deemed nutritionally desirable, and which in its said crystalline form has an angular structure when broken or ground, enclosed and tenaciously bound therein, said particles being of a size similar to that of particles of flour and having the characteristics of flowing freely and easily when mixed with flour.

6. The product of claim 5 in which the said substance is aneurin.

7. The product of claim 5 in which the said substance is a water-soluble iron compound.

8. The process of claim 2 in which the said substance is a water-soluble iron compound.

9. The process of claim 4 in which the said substance is a water-soluble iron compound.

ALBERT GREEN.

REFERENCES CITED

The following references are of record in the file of this patent:

UNITED STATES PATENTS

| Number | Name | Date |
|---|---|---|
| 1,157,935 | Gray | Oct. 26, 1915 |
| 1,431,156 | Geere | Oct. 10, 1922 |
| 1,431,525 | Hoffman | Oct. 10, 1922 |
| 1,689,697 | Thornton | Oct. 20, 1928 |
| 1,722,501 | Kokatnur | July 20, 1929 |
| 1,974,808 | Dietz | Sept. 25, 1934 |
| 2,044,194 | Visser | June 16, 1936 |
| 2,071,841 | Kelling | Feb. 23, 1937 |
| 2,085,421 | Donk | June 29, 1937 |
| 2,146,958 | Katera | Feb. 4, 1939 |
| 2,149,682 | Jorgensen | Mar. 7, 1939 |
| 2,188,319 | Siemers | Jan. 30, 1940 |
| 2,230,417 | Wellinghoff | Feb. 4, 1941 |
| 2,239,543 | Andrews | Aug. 22, 1941 |
| 2,259,543 | Billings | Oct. 21, 1941 |

FOREIGN PATENTS

| Number | Country | Date |
|---|---|---|
| 112,964 | Australia | May 21, 1941 |
| 161,238 | Great Britain | 1921 |
| 516,513 | Great Britain | 1940 |
| 522,418 | Great Britain | June 10, 1940 |

OTHER REFERENCES

American Miller, "Reports from the Front," vol. 72, No. 6, page 76.

Chemical Abstracts: 25: 3034 (8) 1931; 25: 4916 (5) 1931; 29: 6656 (1) 1935; 30: 3481 (4) 1936.